(12) United States Patent
Okamoto

(10) Patent No.: US 7,660,523 B2
(45) Date of Patent: Feb. 9, 2010

(54) INTERMITTENT PHOTO-TAKING DEVICE

(75) Inventor: Takaaki Okamoto, Fujisawa (JP)

(73) Assignee: Nikon Corporation, Tokyo (JP)

( * ) Notice: Subject to any disclaimer, the term of this patent is extended or adjusted under 35 U.S.C. 154(b) by 355 days.

(21) Appl. No.: 11/605,327

(22) Filed: Nov. 29, 2006

(65) Prior Publication Data

US 2007/0122143 A1    May 31, 2007

(30) Foreign Application Priority Data

Nov. 30, 2005    (JP)    ............... 2005-345313

(51) Int. Cl.
*G02B 21/36*    (2006.01)
(52) U.S. Cl. .............. 396/432; 396/265; 359/363; 359/383; 348/80
(58) Field of Classification Search ............... 396/432, 396/265; 359/383, 363; 348/79–80
See application file for complete search history.

(56) References Cited

U.S. PATENT DOCUMENTS

| | | | |
|---|---|---|---|
| 3,721,827 A | 3/1973 | Reinheimer | 250/201 |
| 4,595,829 A | 6/1986 | Neümann et al. | 250/201 |
| 4,958,920 A | 9/1990 | Jorgens et al. | 350/530 |
| 5,260,825 A | 11/1993 | Nagano et al. | 359/368 |
| 5,489,966 A * | 2/1996 | Kawashima et al. | 355/43 |
| 5,530,237 A | 6/1996 | Sato et al. | 250/201.4 |
| 6,760,154 B1 | 7/2004 | Focht | 359/383 |
| 7,071,451 B2 * | 7/2006 | Ishikawa et al. | 250/201.4 |
| 7,345,814 B2 * | 3/2008 | Yoneyama et al. | 359/383 |
| 7,426,345 B2 * | 9/2008 | Takamatsu et al. | 396/432 |
| 2004/0253742 A1 * | 12/2004 | Affleck et al. | 436/165 |

FOREIGN PATENT DOCUMENTS

JP    04-086615    3/1992

* cited by examiner

*Primary Examiner*—W. B. Perkey
*Assistant Examiner*—Dennis Hancock
(74) *Attorney, Agent, or Firm*—Morgan Lewis & Bockius LLP

(57) ABSTRACT

Providing an intermittent photo-taking device capable of correcting a focus drift in the optical axis direction by moving a stage to focus on a plurality focus position of a sample. The intermittent recording device 9 receives setting of a photo-taking timing for the intermittent recording, sets to a driving system 2 a plurality of focus points to take photographs of the sample in each photo-taking timing as relative positions with respect to a predetermined reference position, at each photo-taking timing, obtains a focus position as a reference position by the autofocus movement, varies the relative position between the microscope 1 and the stage 51 to focus on the set photo-taking position of the sample S on the basis of the obtained reference position and the relative positions, makes the photo-taking device 8 take photograph of the sample in each focus position, and captures the taken images.

7 Claims, 12 Drawing Sheets

INTERMITTENT PHOTO-TAKING DEVICE

The disclosure of the following priority application is herein incorporated by reference:
Japanese Patent Application No. 2005-345313 filed on Nov. 30, 2005.

BACKGROUND OF THE INVENTION

1. Field of the Invention

The present invention relates to an intermittent photo-taking device for a microscope.

2. Related Background Art

There has been known an intermittent photo-taking device for a microscope disclosed in such as Japanese Patent Application Laid-Open No. 4-086615. The device makes it possible to take intermittent photographs of a plurality of sample points of the same sample, to reduce time for the intermittent photo-taking, and to obtain a plurality of data from the same sample under the same condition by means of providing a photo-taking device capable of capturing an image formed by a microscope and an intermittent recording device capable of recording a plurality of images captured by the microscope with respect to a plurality of sample points with a desired time lapse.

In the course of intermittent photo-taking of a microscope with a desired time lapse, it may happen that some images are taken and recorded in a state without focusing on the object to be observed. The problem is caused such that as time goes on, the object to be observed is moved along the optical axis, since the stage itself on which the object is placed is displaced along the optical axis by expanding or shrinking by means of varying temperature or a minute amount of natural drop thereof.

SUMMARY OF THE INVENTION

The present invention is made in view of the aforementioned problems and has an object to provide an intermittent photo-taking device capable of correcting displacement of focal position along the optical axis generated with the passage of time upon carrying out intermittent photo-taking through a microscope.

According to a first aspect of the present invention, there is provided an intermittent photo-taking device including: a microscope that is equipped with an objective lens used for observing a sample to be observed; an electric stage that holds the sample to be observed; a driving system that controls variation in relative position between the stage and the objective lens, and driving with respect to an autofocus movement; an imaging device that photographs an image of the sample to be observed through the objective lens; and an intermittent recording device that controls the driving system and the imaging device and captures and processes the photographed image. The intermittent recording device includes a receiving means that receives setting of photo-taking timing of the intermittent recording, a relative movement means that makes the driving system set a plurality of focus positions of the sample to be observed to be photographed at each photo-taking timing as relative positions with respect to a predetermined reference position, at each photo-taking timing, obtain a focus position as a reference position by the autofocus movement, and makes the objective lens or the stage move relatively to the focus position set to be photographed of the sample to be observed on the basis of the obtained reference position and the relative positions.

In the first aspect of the present invention, it is preferable that the driving system includes an axial drive controller that controls a relative position in a direction of the optical axis between the objective lens of the microscope and the sample to be observed, an autofocus device that carries out autofocus of the microscope with respect to the sample to be observed, an auto-scanning XY stage that holds the sample and automatically moves the stage on the XY plane in accordance with a predetermined sequence, and a controller that controls drive of the axial drive controller of the objective lens, the autofocus device, and the auto-scanning XY stage, and wherein the controller controls drive of the axial drive controller, the autofocus device, and the auto-scanning XY stage in response to an instruction from a setting means that sets a plurality of focus positions to be photographed as relative positions with respect to a predetermined reference position and a moving means that moves the objective lens of the microscope or the stage relatively.

In the first aspect of the present invention, it is preferable that the axial drive controller includes an up-down adjuster that includes a mechanism and an actuator for moving the microscope and the stage of the auto-scanning XY stage in the direction of the optical axis of the objective lens, a linear scale that measures a position of the objective lens in the axial direction, a stage controller that controls drive of the up-down adjuster on the basis of an instruction of the controller and the measured value of the linear scale, a light source, a focusing optical system that focuses a light image based on the light source onto the sample through the objective lens, an imaging optical system for autofocus that reflects light from the light image on the sample, detects through the objective lens, and forms a reflected image of the light image, and an offset lens that moves either one of the light image and the reflected image or both in the direction of the optical axis, and wherein the stage controller carries out up-down control of the stage upon carrying out autofocus with an instruction from the autofocus device, and the autofocus device includes a moving mechanism that moves an interface between a holder in which the sample to be observed is stored and the sample stored in the holder as the focus position in the direction of the optical axis by the up-down adjuster, and an offset lens mechanism capable of focusing on inside of the holder by using the offset lens by assuming the interface to be inside of the holder.

In the first aspect of the present invention, it is preferable that the autofocus device of the intermittent recording device makes the function to focus on the interface on and off in response to an instruction from the intermittent recording device, and instructs the position of the offset lens in the direction of the optical axis.

In the first aspect of the present invention, it is preferable that the autofocus movement is activated until starting photo-taking and deactivated upon starting photo-taking.

In the first aspect of the present invention, it is preferable that the autofocus movement is activated by the time starting photo-taking and kept activated during photo-taking.

Other features and advantages according to the present invention will be readily understood from the detailed description of the most preferred embodiments in conjunction with the accompanying drawings.

BRIEF DESCRIPTION OF THE DRAWINGS

FIGS. 5A, 5B and 5C are flowcharts each showing a procedure for storing focal position of each photo-taking in which FIG. 5A shows a case when a focal position is set by an offset lens, FIG. 5B shows a case when a focal position is set by a focusing adjuster, and FIG. 5C shows another case when a focal position is set by a focusing adjuster.

DESCRIPTION OF THE MOST PREFERRED EMBODIMENTS

An embodiment according to the present invention is explained below with reference to accompanying drawings. In the present embodiment, a case is explained as an example where a sample to be observed which is put in a transparent holder is observed. However, the present invention is not limited to the embodiment.

Figure 1:
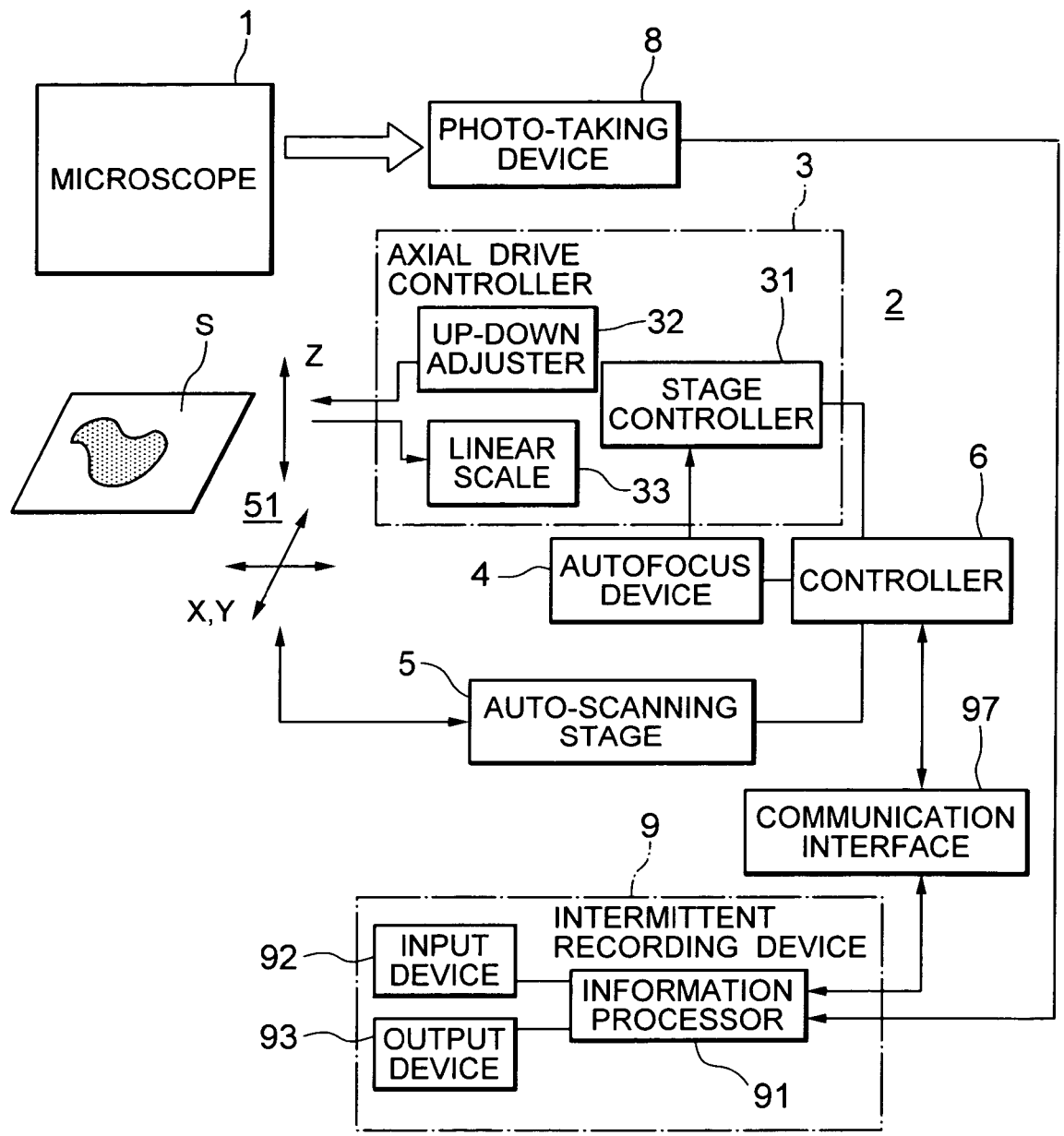
FIG. 1 is a block diagram showing a rough configuration of an intermittent photo-taking device according to an embodiment of the present invention.

FIG. 1 is a block diagram showing a rough configuration of an intermittent photo-taking device according to an embodiment of the present invention. The intermittent photo-taking device shown in FIG. 1 is equipped with a microscope 1 used for observing a sample S to be observed, a stage 51 for holding the sample S, a driving system 2 that varies a relative position between the stage 51 and the microscope 1 and drives and controls an autofocus movement, a photo-taking device 8 that takes images of the sample S through the microscope 1, an intermittent recording device 9 that controls the driving system 2 and the photo-taking device 8 and captures and processes the taken images, and a communication interface 97 that is disposed between the intermittent recording device 9 and the driving system 2.

The intermittent recording device 9 receives setting of a photo-taking timing for the intermittent recording indicated by a user at an information processor 91 and sets a plurality of focus points to take photographs of the sample in each photo-taking timing as relative positions with respect to a predetermined reference position. At each photo-taking timing, the intermittent recording device 9 obtains a focus position as a reference position by the autofocus movement, displaces relatively the microscope 1 or the stage 51 to focus on the set photo-taking position of the sample S on the basis of the obtained reference position and the relative positions, makes the photo-taking device 8 take photograph of the sample in each focus position, and captures the taken images. The specific details of the function will be explained later.

Although not shown in the figure, the microscope 1 has a lens system such as an objective lens that obtains an image of the sample S to be observed, and a photo-taking optical system that leads the light from the lens system to the photo-taking device 8. The microscope 1 is equipped with a revolver (not shown) for changing the objective lens, and an illumination device (not shown) for illuminating the sample S to be observed.

The driving system 2 has an axial drive controller 3 that controls the relative position between a first objective lens (not shown) of the microscope 1 and the sample S to be observed along the optical axis (Z axis), an autofocus device 4 that adjusts a focus point of the first objective lens on the sample S automatically, an auto-scanning XY stage 5 that holds the sample S and moves the stage 51 in the XY plane automatically in accordance with a predetermined sequence, and a controller 6 that carries out driving control of the axial drive controller 3, the autofocus device 4, and the auto-scanning XY stage 5.

The axial drive controller 3 has an up-down adjuster 32 that includes a mechanism and an actuator for moving the microscope 1 and the stage 51 of the auto-scanning XY stage 5 along the optical axis, a linear scale 33 that measures the position of the microscope 1 and the stage 51 in the direction of the optical axis, and a stage controller 31 that carries out driving control of the up-down adjuster 32 on the basis of an instruction of the controller 6 and a measured value of the linear scale 33. An instruction from the autofocus device 4 is input to the stage controller 31, and the stage controller 31 controls the stage 51 up and down upon carrying out autofocus. The linear scale 33 may be constructed by, for example, a linear encoder.

The autofocus device 4 includes a mechanism for moving the stage 51 in the direction of the optical axis (Z axis) by using the up-down adjuster 32 making an interface (bottom surface) of the transparent holder in which the sample S to be observed is put as the focus position, and an offset mechanism that makes it possible to focus on inside of the transparent holder by using an offset lens (focusing adjuster lens) to imaginarily make the interface of the transparent holder to be inside the transparent holder. The offset lens is such a lens that is disposed, for example, on the optical path between the illumination device and the first objective lens and makes it possible to adjust focusing by moving it along the optical path.

The autofocus device 4 can make on/off the function for focusing on the interface. The on/off control can be carried out from an instruction made by the intermittent recording device 9. Moreover, the position of the offset lens can be instructed by the intermittent recording device 9. With constructing in this manner, it becomes possible to correct a shift of focusing upon photo-taking, to take and store images of the sample S at desired positions. Although a transparent holder is used here, the present invention is not limited to it. Moreover, a petri dish is typically used for this purpose.

The controller 6 controls an electric device connected to the microscope 1 such as a revolver for moving the objective lens to the optical axis. The controller 6 controls the driving system 2 in accordance with a predetermined program in response to an instruction from the intermittent recording device 9. On this occasion, the controller 6 carries out driving control of the axial drive controller 3, the autofocus device 4, and the auto-scanning XY stage 5 in accordance with instructions from a means for setting a plurality of focus positions of the sample S to be photographed as relative positions from a predetermined reference position and a means for relatively dispacing the microscope 1 or the stage 51.

The communication interface 97 connects communication between the controller 6 and the intermittent recording device 9. Specifically, the communication interface 97 adjusts physical discordance such as a cable or a signal. In order to give and receive information with each other, necessary processing such as an adjustment of a transmission speed, and conversion of a data format is carried out. Typically, it is mentioned that a standardized communication cable is used, and that each unit is connected to the LAN. When the controller 6 and the intermittent recording device 9 may be connected directly, the communication interface can be omitted.

The photo-taking device 8 captures an image of the sample S to be observed obtained by the microscope as a picture image. For example, a camera having a CCD can be used. An obtained picture image is transmitted to the intermittent recording device 9 as a digital signal.

The intermittent recording device 9 is composed of a computer. Specifically, the intermittent recording device 9 has an information processor 91 which includes a central processing unit (CPU) and a memory, an input device 92, and an output device 93. The intermittent recording device 9 carries out control such as various instructions regarding photo-taking, and storing a taken image data. Accordingly, the intermittent recording device 9 outputs instructions to the aforementioned driving system 2 and the photo-taking device 8, and receives information from these devices. The input device 92 is composed of devices capable of instructing operation, and inputting characters, for example, a keyboard and a mouse. A display is typically used as the output device 93. In addition, a printer can be connected. As the input device 92 and the output device 93, a read and write device for a storage medium for carrying out data input/output can be listed. For example, an USB port capable of read/write a data from/on an USB memory can be listed.

In the intermittent recording device 9, the CPU of the information processor 91 carries out various processing in accordance with programs installed in the memory. In other words, the information processor 91 carries out intermittent photo-taking movement by constructing specifically the following means: a receiving means that receives setting of intermittent photo-taking timing; a setting means that sets a plurality of focus positions of the sample S to be photographed as relative positions with respect to a predetermined reference position to the driving system 2 at each photo-taking timing; an instructing means that makes the driving system 2 obtain a focus position as a reference position by the autofocus movement of the autofocus device 4 at each photo-taking timing and makes the relative positions of the microscope 1 or the stage 51 vary to the focus position to be photographed set to the sample S on the basis of the obtained reference position and the relative positions; and an obtaining means that instructs to photograph at each focus position and captures the photographed picture image.

The information processor 91 stores the picture image photographed by the photo-taking device 8 in a memory installed therein at, for example, each desired time or regular time interval. Moreover, the information processor 91 communicates with the controller 6, controls the axial drive controller 3, the autofocus device 4 and the auto-scanning XY stage 5 through the controller 6, and obtains control information showing a state of the driving system 2 such as position information. With the instruction from the intermittent recording device 9, the controller 6 moves the auto-scanning XY stage 5 and carries out intermittent photo-taking of a plurality of sample points of the same sample (sample S).

Then, the movement of the intermittent photo-taking device is further explained below. At first, what kind of photo-taking modes are available is explained.

For example, the following kinds are listed as intermittent photo-taking modes:

A) a method to photograph a single sample point at each desired time interval;

B) a method that, when the sample is thick, a plurality of frames are photographed in each photo-taking time with changing focus position at each desired time interval;

C) a method that a plurality of sample points are photographed at each desired time interval;

D) a method that a plurality of frames are photographed with setting a plurality of microscopes at each desired time interval;

E) a method that combines the above-described methods B, C, and D.

These methods are explained below. In these methods, the intermittent recording device 9 controls the axial drive controller 3, which includes the stage controller 31, the up-down adjuster 32 and the linear scale 33, the autofocus device 4, and the auto-scanning XY stage 5 through the controller 6.

A) a method to photograph a single sample point at each desired time interval:

A case that a single sample point of a sample S to be observed is photographed at each desired time interval is explained. In this case, regarding (1) through (3), the order of processing does not necessary to take turns.

(1) The intermittent recording device 9 receives various setting inputs from an operator necessary for the observation. A window receiving various setting inputs for photo-taking procedure is shown on a display of the output device 93. In accordance with the guidance of the window, necessary items are input by using the input device 92. A standard setting prepared by the system is displayed and receives a change of a portion or whole portion. A setting already done with a similar sample is stored in advance and the setting may be reused. The intermittent recording device 9 receives from the operator photo-taking procedures for a time lapse photograph such as positions to be photographed, the order, the times, and photo-taking timing. As for the photo-taking timing, for example, it may be received for setting such that after start recording at 0 second, taking photos takes place at 10-second time intervals.

(2) The intermittent recording device 9 receives inputs for operating conditions of each device in the microscope 1 in the same manner. Various necessary settings for the microscope 1 observation are received such that, for example, magnification of the objective lens is to be set to 10×, and an episcopic illumination is to be inserted in the optical path. The intermittent recording device 9 instructs the received operation condition to the controller 6 through the communication interface 97.

(3) The intermittent recording device 9 receives an instruction from the operator to switch on the autofocus device 4 and transmits it to the controller 6. The controller 6 controls the autofocus device 4 to switch on and instructs to focus on the position of the sample to be observed by the offset lens.

(4) Start intermittent photo-taking. The intermittent recording device 9 controls time lapse which is a waiting time to the set photo-taking timing. At the photo-taking timing, the intermittent recording device 9 instructs the photo-taking device 8 to photograph, and the photographed picture image is captured and stored in the intermittent recording device 9.

(5) The intermittent recording device 9 carries out a procedure to terminate the intermittent recording. Specifically, whether whole intermittent photo-taking procedures set in the above-mentioned (1) have been completed or not is checked. When the whole procedures have been completed, a series of photo-taking is terminated.

Figure 2:
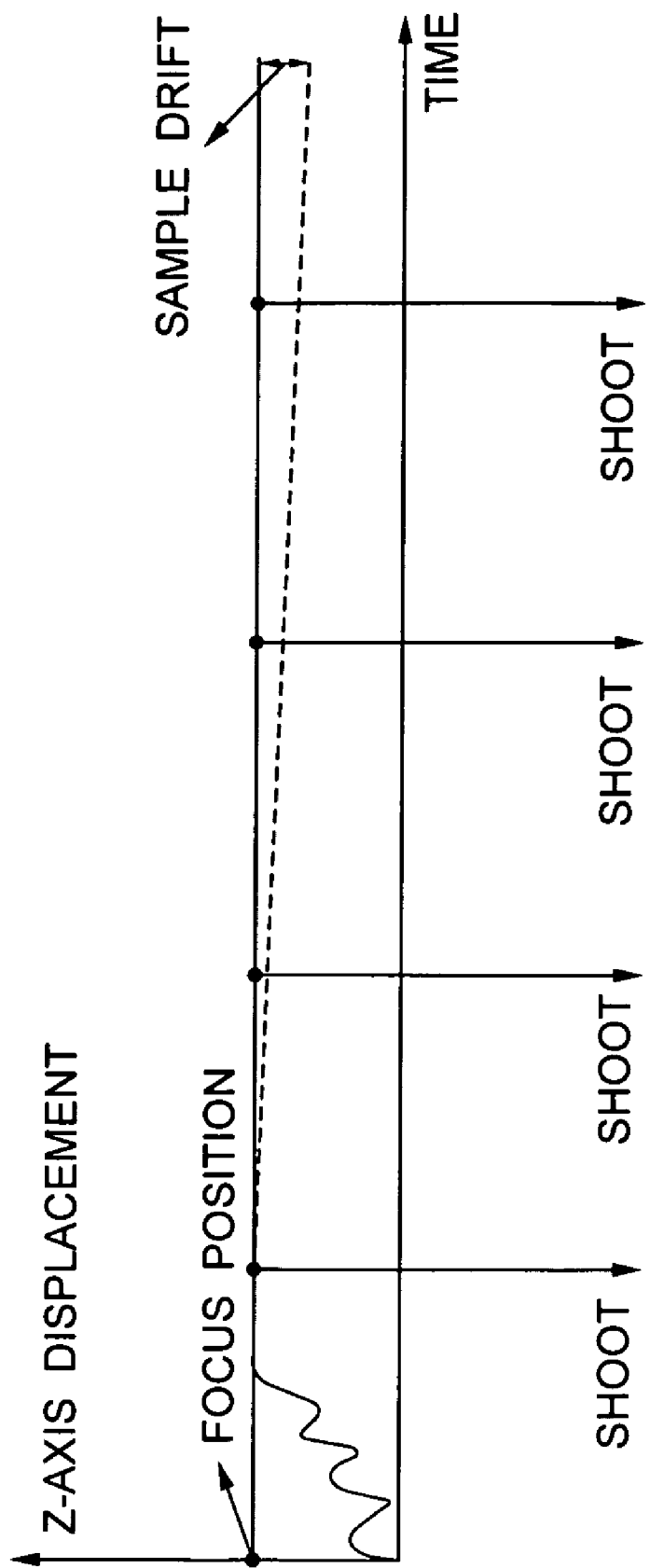
FIG. 2 is an explanatory diagram showing an effect of a drift upon carrying out intermittent photo-taking with turning off an autofocus device.
Figure 3:
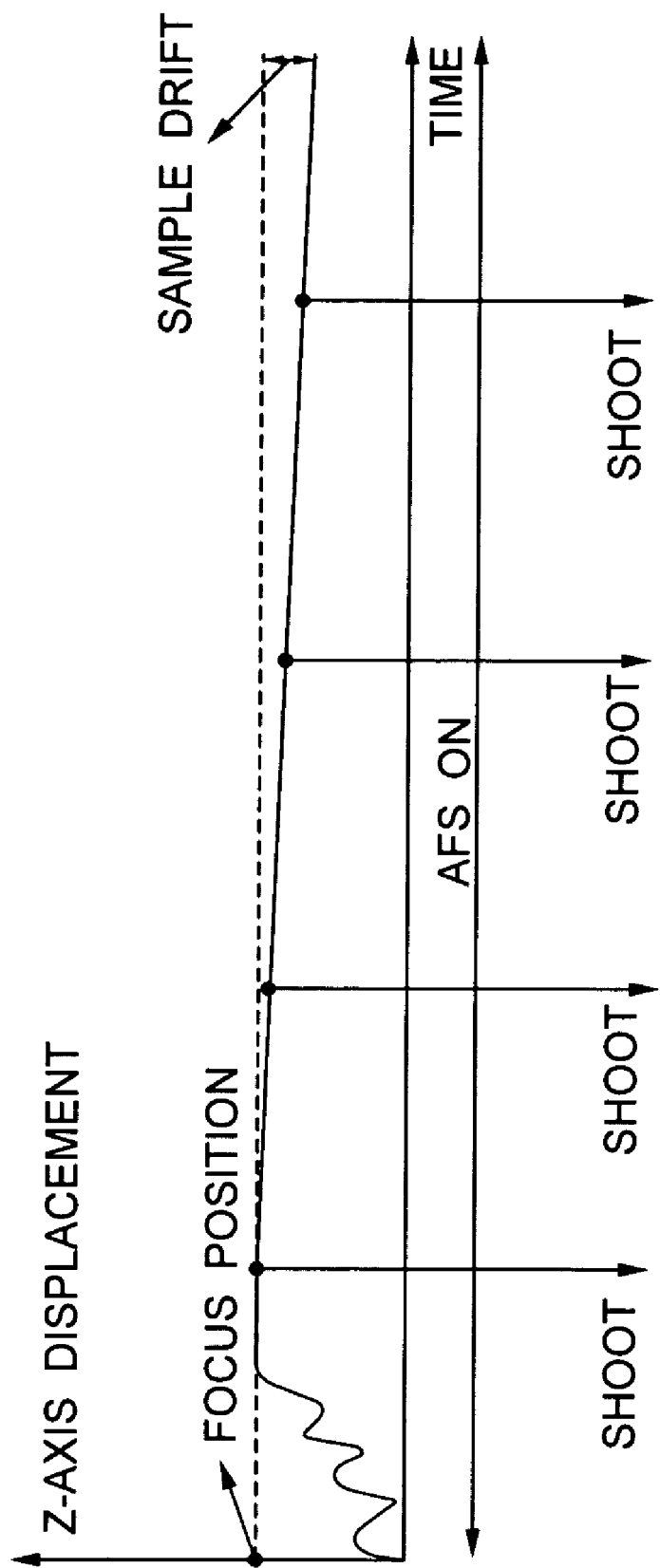
FIG. 3 is an explanatory diagram showing an effect of a drift upon carrying out intermittent photo-taking with turning on an autofocus device with the same procedures used in FIG. 2.
Figure 4:
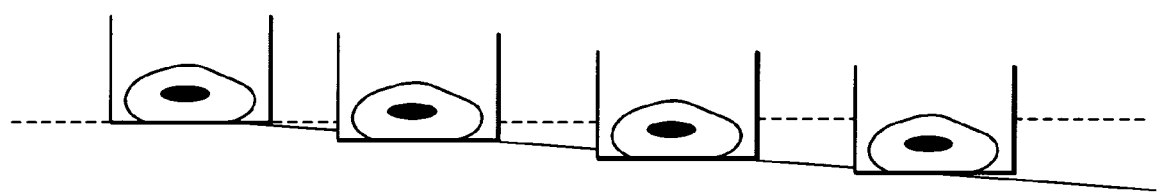
FIG. 4 is an explanatory diagram showing a drift of a sample to be observed.

Here, the effect of the autofocus movement of the autofocus device 4 is explained. An example shown in FIG. 2 shows an effect of a sample drift when carrying out intermittent photo-taking with the same procedures with switching off the autofocus operation of the autofocus device 4. In the case of FIG. 2, since the focus position is constant, all focus positions are constant in the picture image at each photo-taking timing. However, the sample surface is actually drifted as shown as a broken line, so that focal point does not coincide with the sample surface. On the other hand, as shown in FIG. 3 according to the present invention, when switching on the autofocus operation of the autofocus device 4, the focus position follows the sample drift by the axial drive controller 3 and comes to the position coinciding with the sample surface. Accordingly, photo-taking is always carried out in a state focusing on the sample surface. FIG. 4 is an explanatory diagram showing a drift of a sample to be observed.

B) a method that, when the sample is thick, a plurality of frames are photographed in each photo-taking time with changing focus position at each desired time interval:

In this method, as same as the method A), initial setting is carried out. That the order of processing does not necessary to take turns is the same as the method A). Since setting (1) and (2), and processing (5) are the same as the above-described method A), processings on and after (3) are explained. In this case also, by adding the autofocus device, the same position of the sample to be observed can be photographed at each photo-take timing.

(3) The intermittent recording device 9 stores a focus position of each photo-taking. As for the mode of storing, there are three modes as described later.

(4) The intermittent recording device 9 starts intermittent recording. Recording is intermittently carried out at plurality of timings. The intermittent recording device 9 stores photographed picture images in the intermittent recording device 9 in response to the photo-taking timing at each recording time.

In each time of the predetermined plurality of photo-taking timings, a plurality of picture images are taken with changing focus position. In a method to move focus position to photograph with different focus positions at one photo-taking timing, there are two methods as described later.

Procedures for recording focus position of each photo-taking is explained with reference to FIGS. 5A, 5B and 5C.

(51) Focus positions are set by the offset lens.

Figure 5:
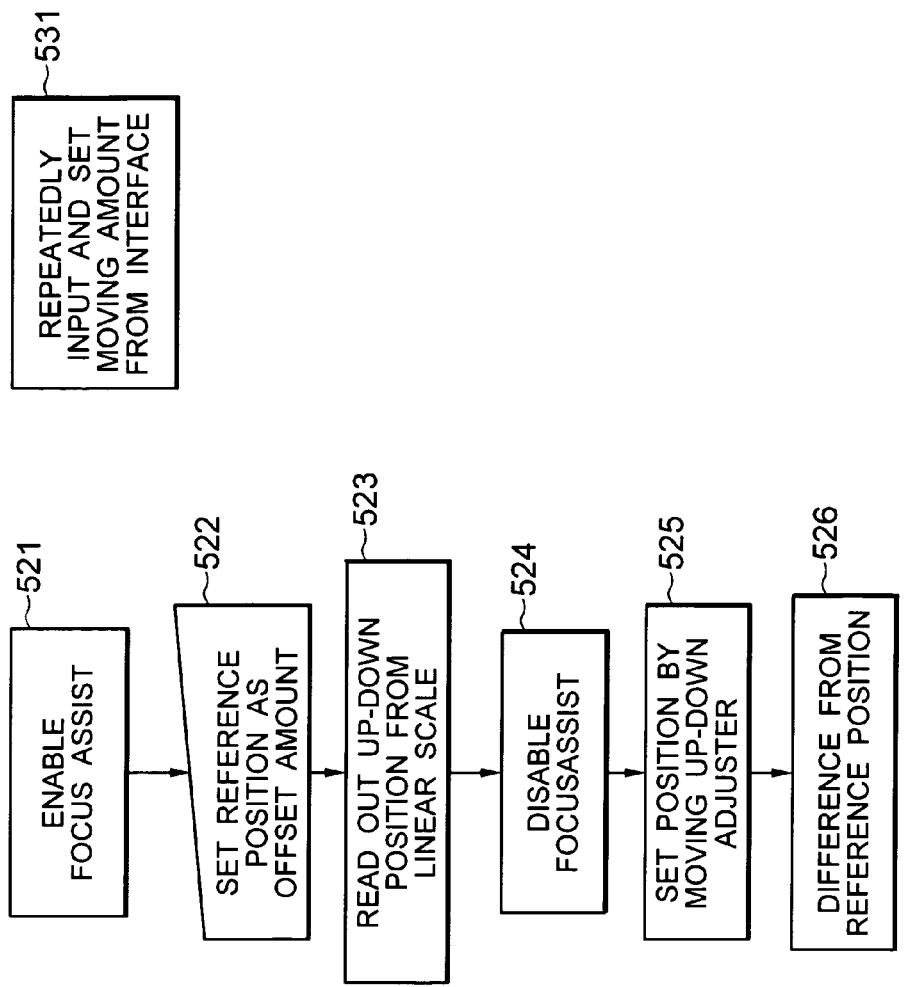

As shown in FIG. 5A, a focus assist is enabled. Specifically, the autofocus device 4 is instructed to be switched on (step 511). The operator focuses on the desired position of the sample S by means of the offset lens and repeats this the number of times to be photographed in one photo-taking timing. In accordance with the instruction of the operator, the intermittent recording device 9 obtains the position as the position of the offset lens and the detected position of the linear scale 33 at each photo-taking and stores as the offset value (step 512).

(52) Focus position is set by the stage controller (-1).

As shown in FIG. 5B, a focus assist is enabled. Specifically, the autofocus device 4 is instructed to be switched on (step 521). The operator operates the up-down adjuster 32 for focusing and a reference position is set by the offset value (step 522). The position of the offset lens and position of the linear scale 33 at the reference position of the sample to be observed are read out and the read out value and the reference position are captured through the controller 6 and stored as the offset value (step 523).

Here, the focus assist is disabled. In other words, the autofocus device 4 is instructed to be switched off (step 524). With using the stage controller 31, the operator instructs the up-down adjuster 32 to move to set these positions, capture the detected value of the linear scale 33 at each position, and calculate and store the difference with respect to the reference position (step 526), and repeats this the number of times equal to the number of frames photographed in one photo-taking timing of a plurality of predetermined photo-taking timings (step 525).

(53) Focus position is set by the stage controller (-2).

As shown in FIG. 5C, the autofocus device 4 is instructed to be switched on. Then, the operator stores the moving amount to the desired position of the sample to be observed (position of the up-down adjuster or position of the offset lens) in the intermittent recording device 9 and repeats this the number of times to be photographed in one photo-taking timing (step 531).

In a method to move focus position at one photo-taking timing, there are two methods as described below. The methods are explained with reference to FIGS. 6 through 9.

Figure 6:
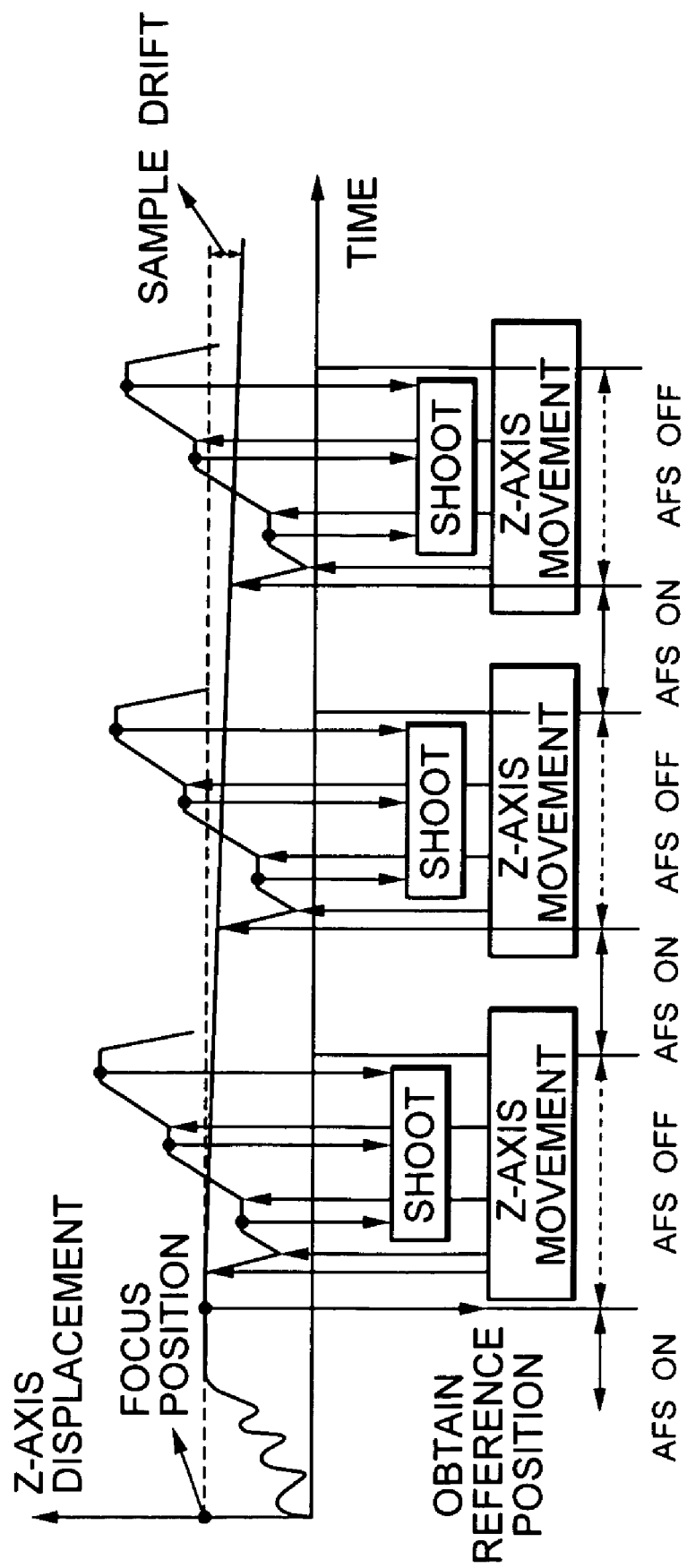
FIG. 6 is an explanatory diagram showing a drift of a sample with respect to each photo-taking timing of a plurality of focal positions according to an embodiment of the present invention.
Figure 7:
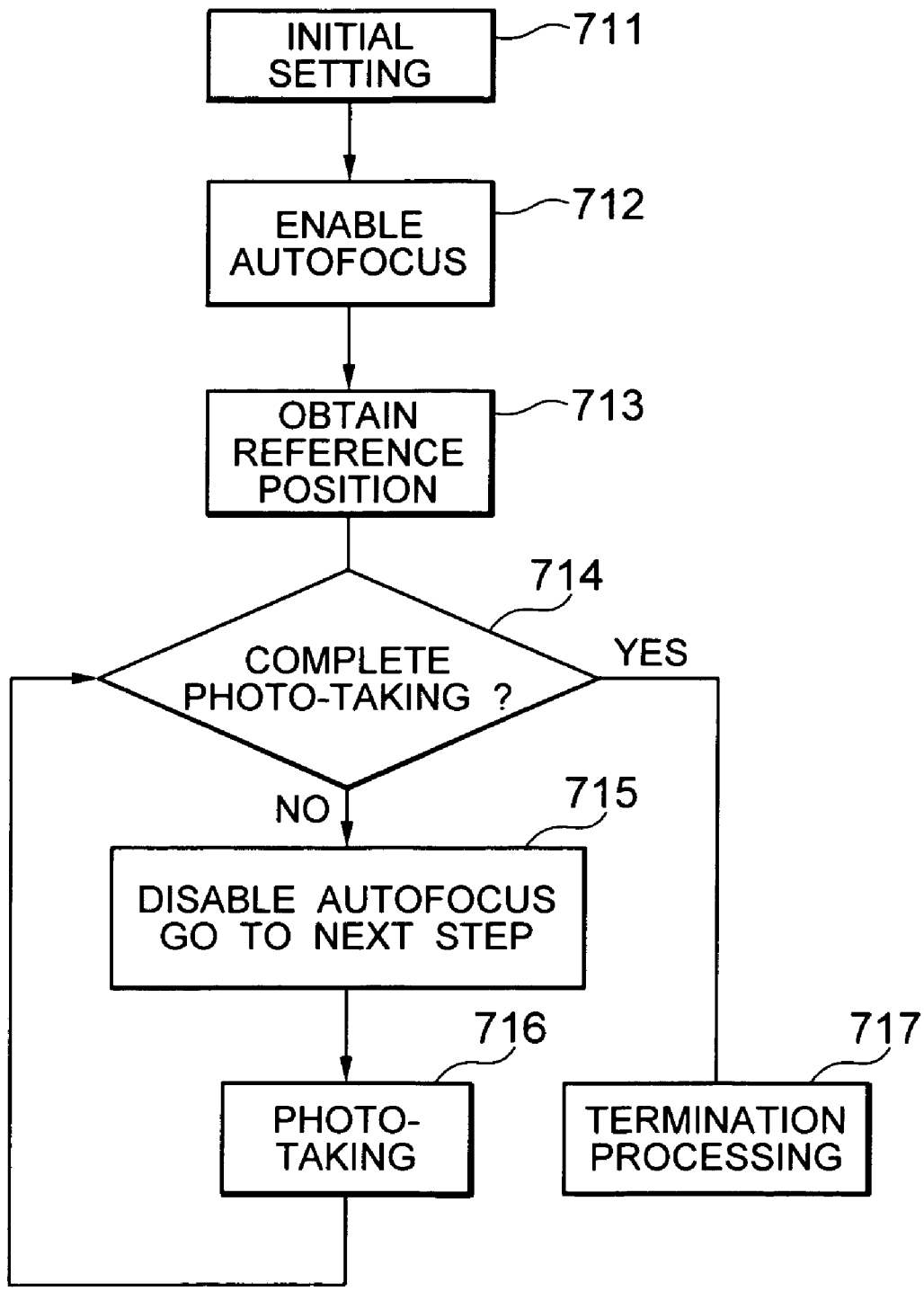
FIG. 7 is a flowchart showing a photo-taking procedure according to an embodiment of the present invention.

Focus position is moved by the up-down adjuster (see FIGS. 6 and 7).

The intermittent recording device 9 receives initial setting for photo-taking operation (step 711). The initial setting has already been explained. Then, in accordance with the predetermined procedure, the autofocus device 4 is made to be enabled, in other words, switched on ("AFS ON" in FIG. 6) until the time to start photo-taking (step 712). In this state, the autofocus device 4 is operated such that the stage 51 is moved in Z direction by the up-down adjuster 32 through the controller 6, and the microscope 1 is focused on the sample. The focus position detected by the linear scale 33 is obtained by the intermittent recording device 9 through the controller 6. The obtained focus position is made to be a "reference position".

Whether the whole photo-taking timing has been photographed or not is checked (step 714). When the whole photo-taking timing has not been completed, the flow proceeds to the next step (step 715). Specifically, when the photo-taking time has come (photo-taking timing), the autofocus device 4 is instructed to be switched off ("AFS OFF" in FIG. 6), the position is read out by the linear scale 33. A difference between this position and the position stored in step (3) is calculated. Specifically, in the aforementioned process (53), a difference between the position recorded by the intermitten recording device 9 and the position to be photographed recorded by the intermittent recording device (PC) is calculated, and the focus position is moved by the up-down adjuster 32.

At the moved position, the sample to be observed is photographed (step 716). On the other hand, when all of the predetermined plurality of photo-taking timings have been completed as shown in FIG. 6, a termination processing is carried out (step 717).

Figure 8:
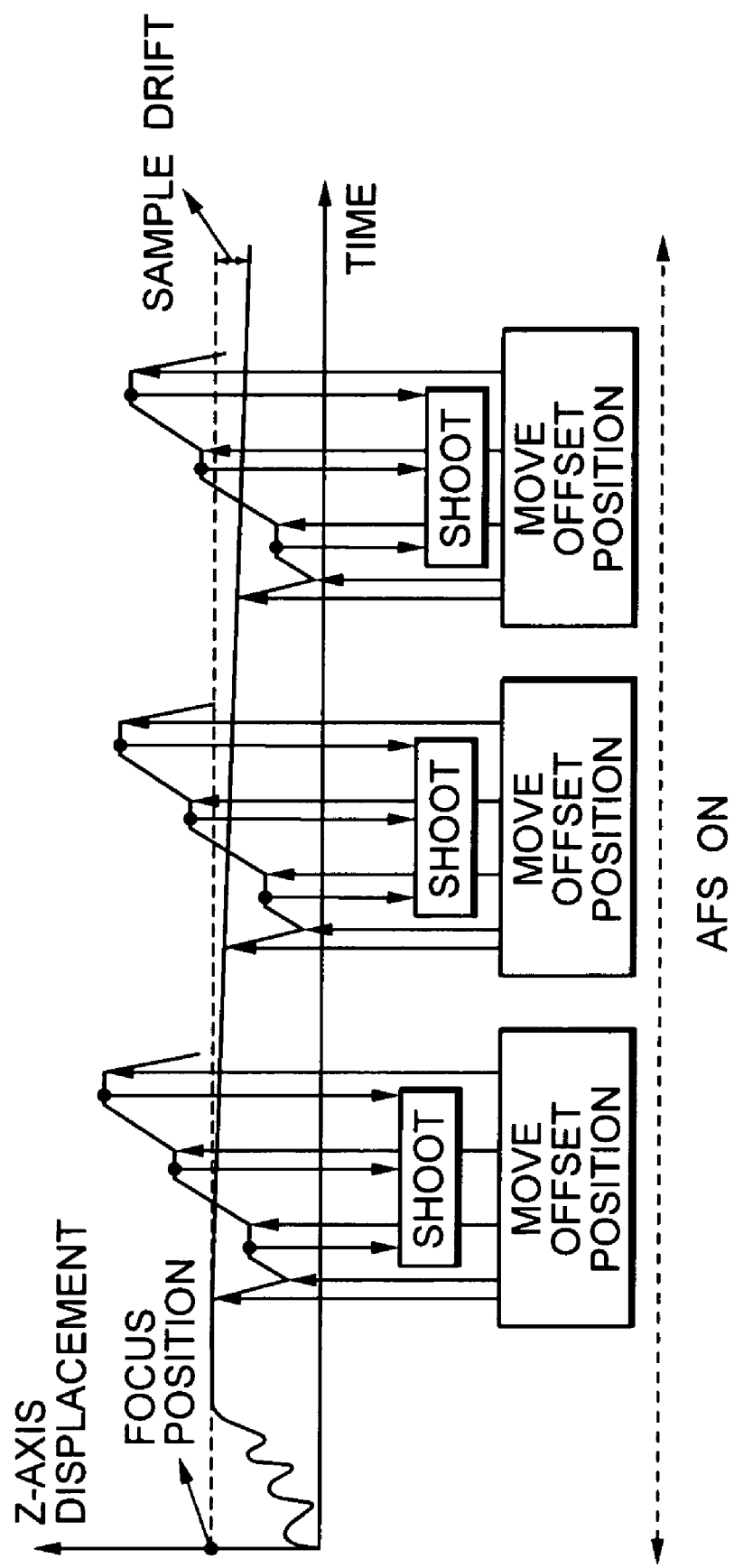
FIG. 8 is an explanatory diagram showing a drift of a sample with respect to each photo-taking timing of a plurality of focal positions according to an embodiment of the present invention.
Figure 9:
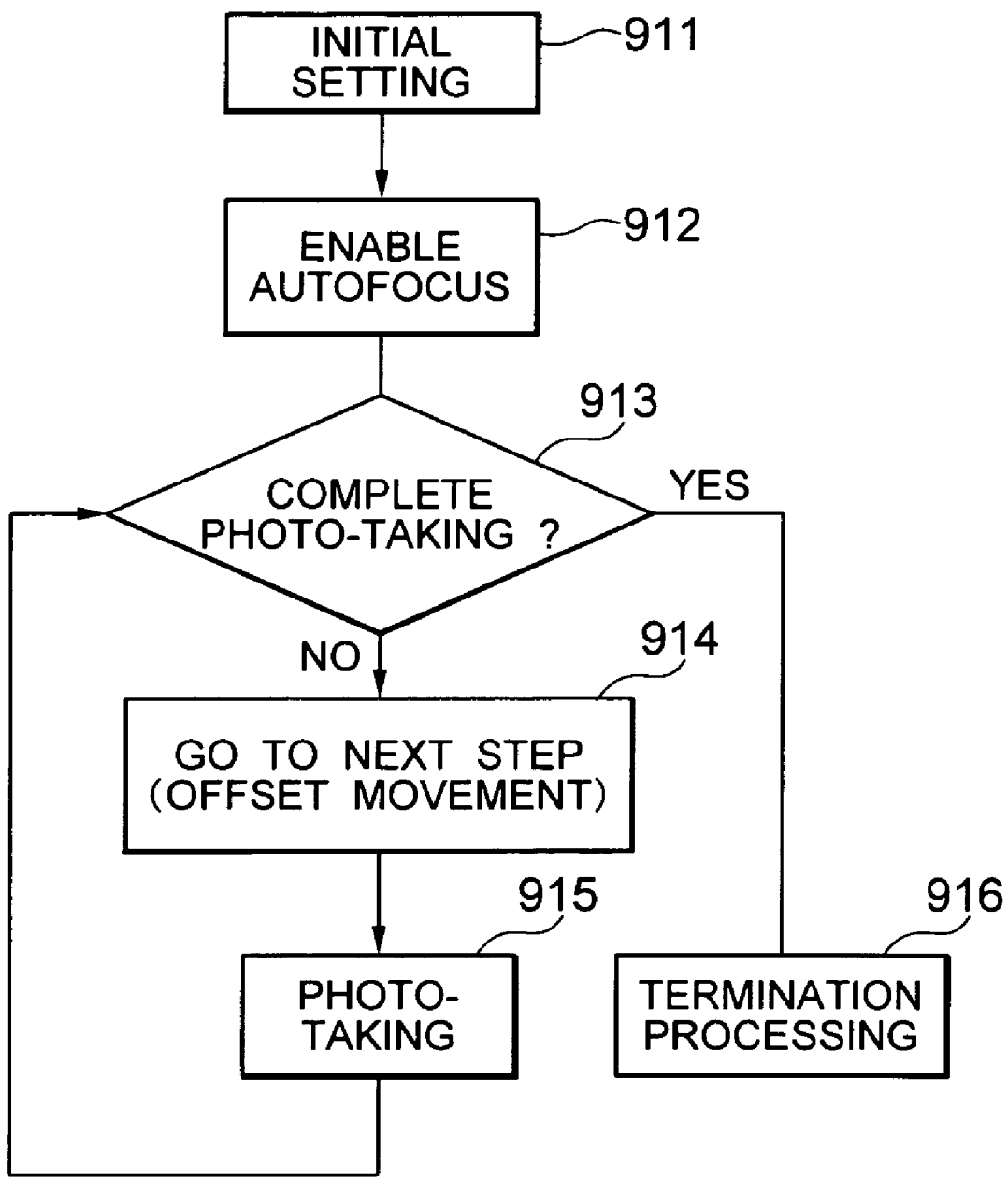
FIG. 9 is a flowchart showing a photo-taking procedure according to an embodiment of the present invention.

(91) Focus position is moved by the offset lens of the autofocus device (see FIGS. 8 and 9).

The intermittent recording device 9 receives initial setting for photo-taking operation (step 911). The initial setting has already been explained. Then, the autofocus device 4 is switched on ("AFS ON" in FIG. 9). When setting of focus position is in accordance with FIG. 5B, the offset lens is moved by converting the position read out from the linear scale 33 to the position of the offset lens. When setting of focus position is in accordance with FIG. 5C, the offset lens is moved by converting the position read out from the linear scale 33 to the position of the offset lens even if the position of the offset lens is not recorded. Setting by the up-down adjuster is effective when the vertical position does not drift within one photo-taking timing.

(C) A method that a plurality of sample points are photographed at each desired time interval.

An example of a case that a plurality of sample positions are photographed at a plurality of times of photo-taking timings is explained. Photo-taking procedures are basically the same as the case described above. However, this case is different in a point that since a plurality of sample positions are to be photographed at one photo-taking timing, necessary setting and photo-taking movement have to be carried out. The following explanation is made with priority given to the difference. As for the figures, since the figures are basically the same as the already referred ones, the explanation is made with reference to already referred figures.

In this method, as same as the method A), initial setting is carried out. That the order of processing does not necessary to take turns is the same as the method A). Since setting (1) and (2), and processing (5) are the same as the above-described method A), processing on and after (3) are explained.

(3) The intermittent recording device 9 stores sample points and focus positions of each photo-taking. As for the mode of storing, there are three modes of (51), (52) and (53) as described above.

In "(51) Focus positions are set by the offset lens", in step 512, the operator focuses on the desired position of the sample S by the offset lens and stores the position in the intermittent recording device 9, and repeats this the number of times to be photographed, and repeats this the number of times equal to the number of sample points in one photo-taking timing.

In "(52) Focus position is set by the stage controller (-1)", in steps 525 and 526, with using the stage controller 31, the operator instructs the up-down adjuster 32 to move to set the position, capture the detected value of the linear scale 33 at each position, and calculate and store the difference with respect to the reference position, and repeats the number of times to photograph, and repeats the number of times equal to the number of sample points in one photo-taking timing of a plurality of predetermined photo-taking timings.

In "(53) Focus position is set by the stage controller (-2)", in step 531, the operator stores the moving amount to the desired position of the sample to be observed (position of the up-down adjuster or position of the offset lens) in the intermittent recording device 9 and repeats this the number of times to be photographed, and repeats this the number of times equal to the number of sample points in one photo-taking timing.

(4) The intermittent recording device 9 starts intermittent recording. Recording is carried out intermittently a plurality of photo-taking timings. The intermittent recording device 9 stores the photographed image in the intermittent recording device 9 at each recording time synchronized with the photo-taking timing.

In each time of the predetermined plurality of photo-taking timings, a plurality of photographs are taken with changing focus position at a plurality of sample points. In a method to move focus position to photograph with different focus positions at each sample point at one photo-taking timing, there are two methods as described above. In each method, the microscope is moved to a predetermined plurality of sample points at each photo-taking timing, and a plurality of frames of photograph are taken at each sample point.

(5) When photo-taking of all sample points at each photo-taking timing of predetermined numbers of times have been completed, the intermittent recording device 9 carries out termination processing.

D) A method that a plurality of frames are photographed with setting a plurality of microscopes at each desired time interval.

Although examples so far take photographs by using a single microscope, in this case, a plurality of microscopes are employed to take a plurality of photographs. Accordingly, a plurality of photo-taking devices 8 are prepared. Likewise, a plurality of axial drive controllers 3 are provided corresponding to the microscopes. On the other hand, the XY stage 51 and the auto-scanning XY stage 5 which drives and controls the stage 51 are commonly provided to the plurality of microscopes. With moving the XY stage, it becomes possible to observe a plurality of sample points of the sample S to be observed with different microscopes.

(1) The intermittent recording device 9 receives various setting inputs from an operator necessary for the observation. In this case, since a plurality of microscopes are used for photo-taking, the intermittent recording device 9 receives settings such as photo-taking procedures regarding each microscope. Individual setting methods are basically the same as the above-described case, so that duplicated explanations are omitted.

(2) The intermittent recording device 9 similarly receives inputs of operation conditions of various devices of each microscope. Various settings necessary for the microscope observation are received such that, for example, magnification of the objective lens is to be set 10×, and an episcopic illumination unit is to be inserted to the optical path. The intermittent recording device 9 instructs regarding the received operation condition to the controller 6 through the communication interface 97.

(3) The intermittent recording device 9 carries out setting and recording of the focus positions with respect to the number of photo-taking frames of each microscope at each photo-taking timing in advance. As for the setting, there are three kinds as described before. In this example, the setting described above in (C) is applied to each microscope. Each setting has been explained before in detail in (C), so the duplicated explanations are omitted. The position is recorded by the intermittent recording device 9.

(4) The intermittent recording device 9 starts intermittent recording. The intermittent recording device 9 controls time lapse which is a waiting time to the set photo-taking timing. At the photo-taking timing, the intermittent recording device 9 instructs the relevant photo-taking device among a plurality of photo-taking devices 8 to photograph, and the photographed picture image is captured and stored in the intermittent recording device 9. The intermittent recording device 9, as described before, controls to move the photo-taking device to a sample point and to move the photo-taking device to a focus position at the sample point. Moreover, the intermittent recording device 9 controls that which microscope carries out the photo-taking.

(5) The intermittent recording device 9 carries out termination processing. Specifically, whether all intermittent photo-taking set in (1) in advance has been completed or not is checked. When all intermittent photo-takings have been completed, a series of photo-takings is terminated.

E) A method that combines the above-described methods B), C), and D).

As described before, B) is a method that, when the sample is thick, a plurality of frames are photographed in each photo-taking time with changing focus position at each desired time interval. C) is a method that a plurality of sample points are photographed at each desired time interval. D) is a method that a plurality of frames are photographed with setting a plurality of microscopes at each desired time interval. Although these methods can be used independently as described above, they can suitably be combined with each other. Intermittent photo-taking can be carried out after completing setting B), C) and D). The following examples may be applicable:

EXAMPLE 1

In each sample point, focus position is varied. In each focus position, the microscope setting is changed and the sample image is photographed.

EXAMPLE 2

In each sample point, the microscope setting is changed. In each microscope, focus position is varied and the sample image is photographed.

The microscope equipped with the aforementioned autofocus device is explained with reference to FIG. 13. In this example, the microscope forms an enlarged image of a sample to be observed and provides for the observation.

Figure 13:
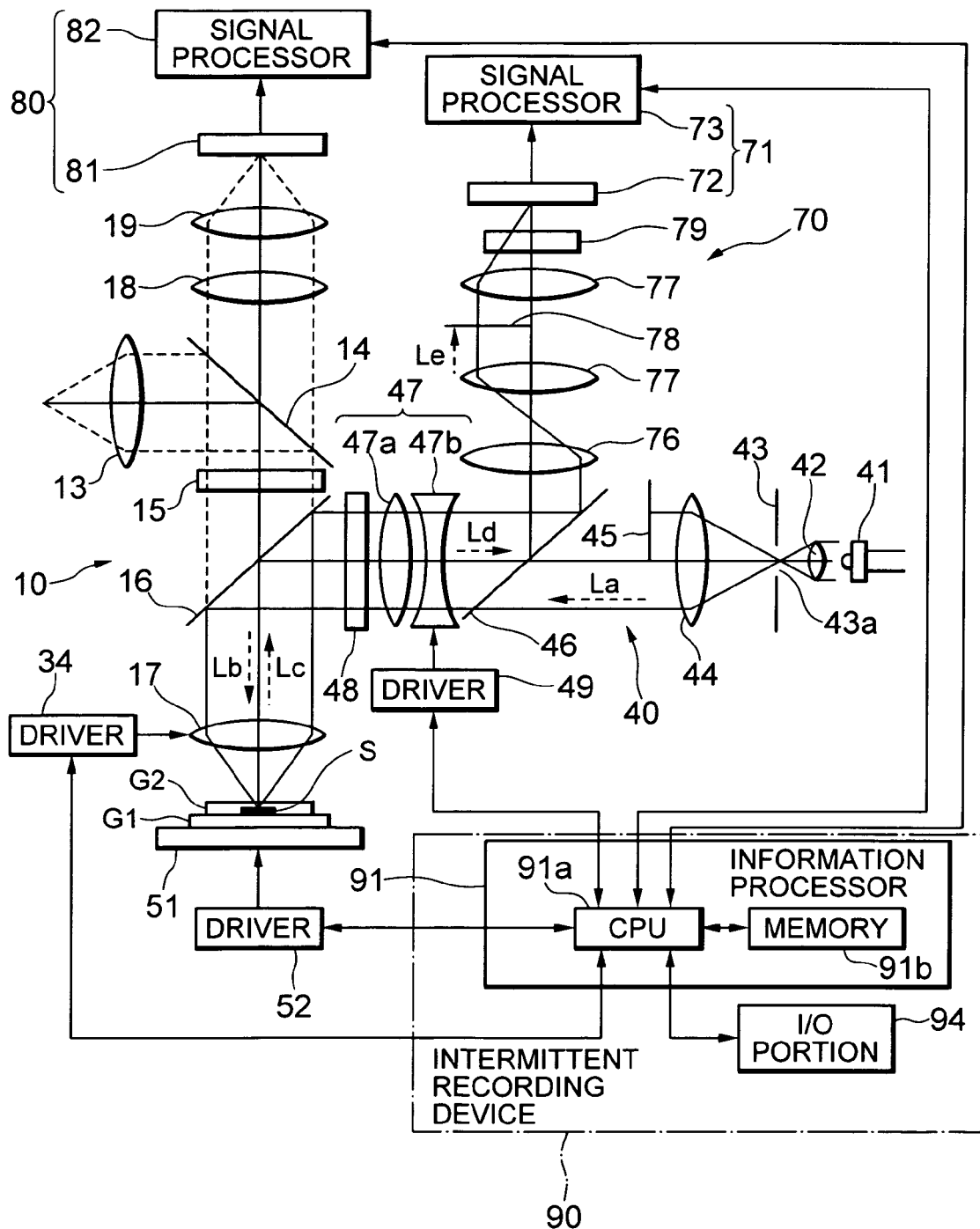
FIG. 13 is an explanatory diagram showing a configuration of a microscope equipped with an autofocus device capable of being used in the present invention.

Although not shown in FIG. 13, a sample S to be observed is immersed in a medium such as water, held between a slide glass G1 and a cover glass G2, and placed on the stage 51.

At first, an optical system of the microscope according to the present embodiment is explained. The optical system of the microscope according to the present invention is composed of an observation optical system 10 disposed over the sample, a focusing illumination optical system 40 which is disposed horizontally to the observation optical system 10 and is an optical system of the autofocus device according to the present embodiment, and an imaging optical system for focusing 70.

The focusing illumination optical system 40 is composed of, in order along the optical axis, an LED light source 41, a first collector lens 42, a slit plate 43, a second collector lens 44, a first pupil limiter 45, a first semi-transparent mirror 46, a focus adjuster lens 47, and a visible light blocking filter 48. At the center of the slit plate 43, there is a slit 43a having an elongated rectangular shape. The slit plate 43 is arranged with centering the optical axis such that the longitudinal direction of the slit 43a comes to a direction perpendicular to the plane of FIG. 13.

Infrared light (near-infrared light) emitted from the LED light source 41 is collected by the first collector lens 42, is incident on the slit plate 43, passes through the slit 43a of the slit plate 43 disposed on a conjugate plane with the sample plane (an interface between the cover glass G2 and the medium in which the sample is immersed), is collimated by the second collector lens 44, and illuminates the first pupil limiter 45. The first pupil limiter 45 is disposed to block a half of the pupil such that a half of the infrared light flux formed with a slit shape with centering the optical axis is blocked along the center line in the longitudinal direction. The infrared light La passed through the first pupil limiter 45 passes through the first semi-transparent mirror 46. The first semi-transparent mirror 46 is disposed at the point where the optical axis of the focusing illumination optical system 40 and the optical axis of the imaging optical system for focusing 70 are crossed, reflects a portion of the infrared light, transmits the other portion, and is commonly used, as described later, with the imaging optical system for focusing 70.

A dichroic mirror 16 is disposed at the point where the optical axis of the focusing illumination optical system 40 and the optical axis of the observation optical system 10 are crossed, and is commonly used with the observation optical system 10 as described later. The dichroic mirror 16 is disposed on the afocal portion of the observation optical path, reflects infrared light, and passes visible light. The infrared light La passed through the first semi-transparent mirror 46, passes through the focus adjuster lens 47, reflected downward (infrared light Lb) by the dichroic mirror 16, converged by a first objective lens 17, and illuminates the sample. The first objective lens 17 is commonly used with the observation optical system 10 as described later. The focus adjuster lens 47 is also explained later.

The first objective lens 17 is attached with a driver 34. The driver 34 moves the first objective lens along the optical axis thereof, and has a mechanism and an actuator for driving a turret upon changing magnification. The driver 34 operates in response to an instruction from an intermittent recording device 90.

The observation optical system 10 is composed of, in order from the sample side, the first objective lens 17, the dichroic mirror 16, an infrared light blocking filter 15, a second semi-transparent mirror 14, and an eyepiece side second objective lens 13. An eyepiece (not shown) is disposed ahead of the eyepiece side second objective lens 13.

An illumination device, not shown, for illuminating the sample placed on the stage 51 is disposed. The illumination device is either a diascopic illumination type or an episcopic illumination type. In the case of the diascopic illumination type, it is disposed under the stage 51, and in the case of the episcopic illumination type, it is disposed over the stage 51.

The stage 51 is connected with a driver 52 for moving the stage 51 in XY directions. The driver 52 moves the stage 51 to an aimed position in response to an instruction from the intermittent recording device 90.

Visible light emitted from the illumination device transmits through the sample S, becomes observation light, passes through the first objective lens 17 and the dichroic mirror 16, is removed infrared light portion by the infrared blocking filter 15, and is incident on the second semi-transparent mirror 14. The second semi-transparent mirror 14 reflects a portion of the observation light and transmits the other portion. The observation light incident on the second semi-transparent mirror 14 is reflected a portion thereof, and forms an observation image of the sample to be observed by the eyepiece side second objective lens 13 and the eyepiece.

A portion of observation light transmitted through the second semi-transparent mirror 14 is converted into an image signal by a photo-taking device 80. In other words, a portion of observation light transmitted through the second semi-transparent mirror 14 is focused on an imaging surface of an imaging CCD sensor 81 through an imaging second objective lens 18 and an imaging relay lens 19, and the image signal is processed by an imaging signal processor 82. The obtained signal is sent to the intermittent recording device 90 to be processed, and the image of the sample is displayed on a monitor (not show) of an I/O portion 94.

Then, the imaging optical system for focusing 70 is explained. The optical system receives infrared light with a slit shape that is illuminated on the sample S placed on the stage 51 by the focusing illumination optical system 40 and reflected from the sample S. In this case, since the sample S on the stage 51 is covered by the cover glass G2, infrared light focused by the first objective lens 17 is reflected from the upper surface of the cover glass G2 or the interface (sample surface) between the cover glass G2 and the sample S. Infrared light reflected from the cover glass G2 or the sample surface is collimated by the first objective lens 17 (infrared light Lc), is reflected horizontally by the dichroic mirror 16 (infrared light Ld), passes through the visible light blocking filter 48 and the offset lens (focus adjuster lens) 47, and is incident on the first semi-transparent mirror 46.

A portion of infrared light Ld incident on the first semi-transparent mirror 46 is reflected upward, and incident on the imaging optical system for focusing 70. The imaging optical system for focusing 70 is composed of, along the optical axis, the first semi-transparent mirror 46, an autofocus second objective lens 76, an autofocus relay lens 77, a second pupil limiter 78, the autofocus relay lens 77, a cylindrical lens 79, and an autofocus CCD sensor 72. Infrared light Ld reflected from the first semi-transparent mirror 46 is converged by the autofocus second objective lens 76 into imaging light to form a slit image. The slit image (infrared light Le) formed by the autofocus second objective lens 76 is relayed by the autofocus relay lenses 77, 77, and is led to an autofocus photo-taking device 71. In the autofocus photo-taking device 71, the slit image is imaged again on the imaging surface of the autofocus CCD sensor 72, and converted into an image signal by a signal processor 73. The image signal is sent to the information processor 91 of the intermittent recording device 90, and processed to generate an instruction for autofocus movement.

The second pupil limiter 78 is disposed to block a half of the pupil and the area to be blocked is corresponding to that blocked by the first pupil limiter 45. The cylindrical lens 79 has refractive power only in a given direction, compresses infrared light Le in a direction perpendicular to the plane of FIG. 13 (in the longitudinal direction of the slit image), and forms an image on the imaging surface of the autofocus CCD sensor 72. The autofocus CCD sensor 72 is possible to be constructed by a line sensor in which a plurality of detectors are disposed in one dimension or an area sensor in which a plurality of detectors are disposed two-dimensionally.

In the above-described explanation, in the focusing illumination optical system 40, light emitted from the LED light source 41 passes through the slit 43a of the slit plate 43 to be a slit shape and an image of the slit 43a is projected on the sample. This is because, in the case of using a spot light, when a difference in levels is there on the sample, the reflected light is dispersed, so that an ideal light amount signal cannot be obtained. Depending on the state of the sample surface, it becomes possible to carry out autofocus-control by projecting an image of the LED light source 41 onto the sample without using the slit plate 43. The first collector lens 42 may not be necessary for realizing autofocus-control.

Then, the focus adjuster lens 47 used in the autofocus device according to the present invention is explained. As typically shown by a first lens 47a and a second lens 47b in FIG. 13, the focus adjuster lens 47 can be composed of a combination of lenses. The focus adjuster lens 47 is attached with a focus adjuster lens driver 49. Although not shown, the focus adjuster lens driver 49 is provided with a focus adjuster lens DC motor for enabling the focus adjuster lens 47 to be moved back and forth along the optical axis, and a focus adjuster lens electric turret for enabling to be changed a plurality of focus adjuster lenses 47 having different magnifications.

In the I/O portion 94 of the intermittent recording device 90 described later, there are disposed a focus position adjuster switch and a focus adjuster lens change switch for moving the focus adjuster lens 47 along the optical axis. When the observer operates the focus position adjuster switch, it becomes possible to move the focus adjuster lens 47 back and forth along the optical axis and when the observer operates the focus adjuster lens change switch, it becomes possible to change and select a desired focus adjuster lens 47 among a plurality of focus adjuster lenses 47 equipped on the focus adjuster lens electric turret.

The intermittent recording device 90 includes the information processor 91 and the I/O portion 94. The information processor 91 includes a CPU 91a and a memory 91b. The I/O portion 94 includes a display and an input portion not shown. The input portion is composed of a mouse, a keyboard, and the like. The input portion may include an input device having better operability such as a joystick. The intermittent recording device 90 differs from the intermittent recording device 9 shown in FIG. 1 in that the intermittent recording device 90 can directly control respective drivers 34, 52, and 49 without the aid of the controller. The intermittent photo-taking operation can basically be carried out similarly. In this embodiment, the intermittent recording device 90 corresponds to the operations using the offset lens.

Figure 10:
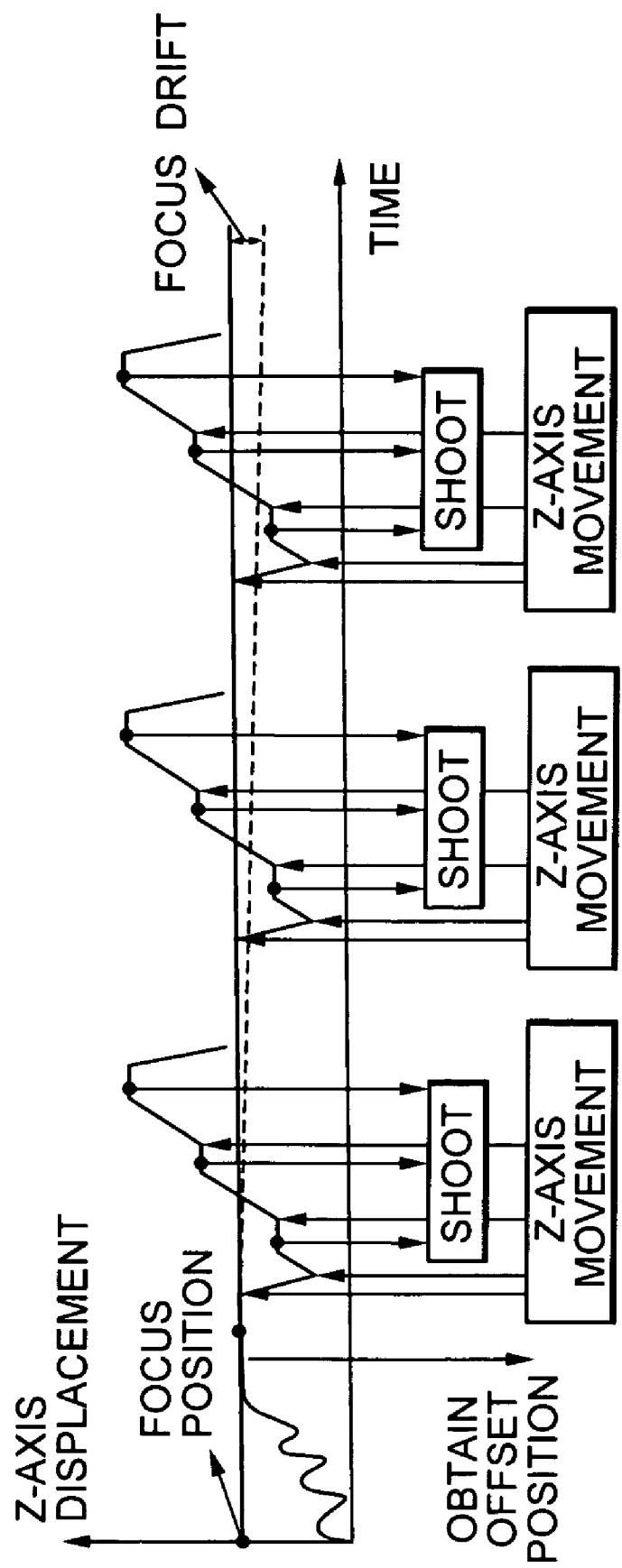
FIG. 10 is an explanatory diagram showing a drift of a sample with respect to each photo-taking timing of a plurality of focal positions according to a prior art.
Figure 11:
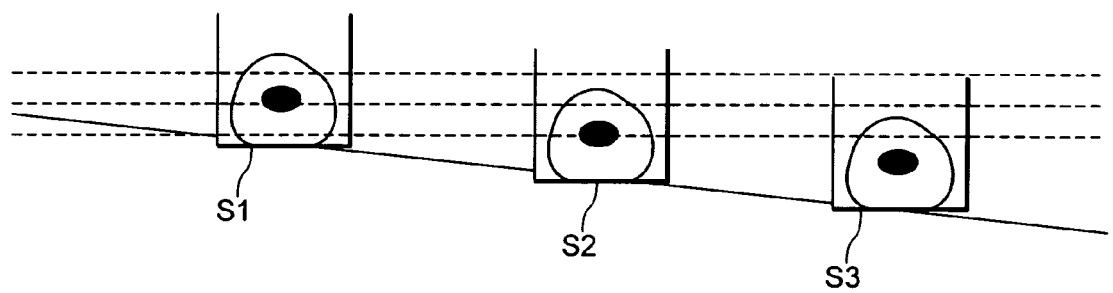
FIG. 11 is an explanatory diagram according to a prior art showing a state where a focal position that is set on a sample S to be observed is shifted by a focus drift.

The effect of the present embodiment is explained. In the conventional intermittent photo-taking as shown in FIG. 10, on the basis of the focus position, a plurality of focus positions obtained at the first timing are defined as absolute positions. A focus (sample) drift that a surface of the sample to be focused on is moved with time happens (a broken line in FIG. 10). However, since each focus position is an absolute position, the focus drift cannot be taken into consideration, so that it may happen that image of a surface of the sample S to be observed is not recorded on the image recorded by the intermittent recording device. As shown, for example, in FIG. 11, the positions to be observed of the sample S move from the set positions (shown by three broken lines) with time. In the sample S1, all of three focus positions are positioned at desired positions of the sample S1. However, in the sample S2, the lower position is not to be photographed. Moreover, in the sample S3, the central position in addition to the lower position is not to be photographed.

Figure 12:
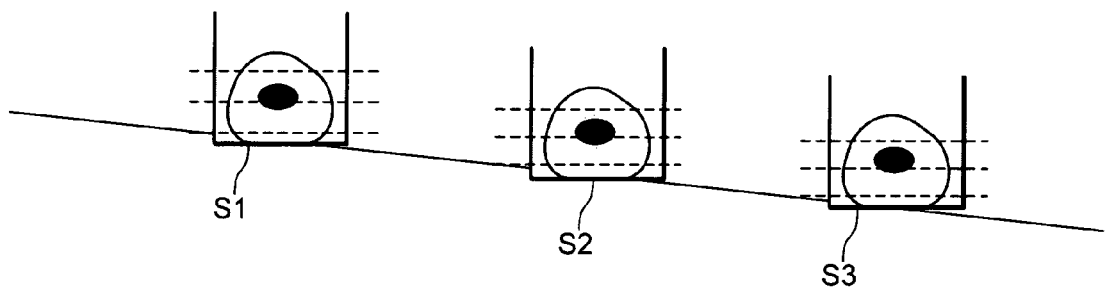
FIG. 12 is an explanatory diagram according to the present invention showing a state where a focal position that is set on a sample S to be observed does not shift even if a focus drift is generated

On the other hand, in the embodiment of the present invention, autofocus operation is carried out by the autofocus device at directly before each photo-taking timing (see FIG. 6) or during a plurality of timings (see FIG. 8). Accordingly, as shown in FIG. 12, even if a focus drift is happened, the three focus positions are photographed in the whole samples S1 through S3. Accordingly, in the embodiment of the present invention, even if the focus drift is happened, the sample can be observed precisely.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. An intermittent phototaking device comprising:
a microscope that is equipped with an objective lens used for observing a sample to be observed;
an electric stage that holds the sample to be observed;
a driving system that controls variation in relative position between the stage and the objective lens, and driving with respect to an autofocus movement of the microscope;
a phototaking device that photographs an image of the sample to be observed through the objective lens; and
an intermittent recording device that controls the driving system and the phototaking device and captures and processes the photographed image;
wherein the driving system includes an autofocus device that carries out autofocusing operation of the microscope with respect to the sample to be observed, and an axial drive controller that controls a relative position in a direction of the optical axis between the objective lens and the sample to be observed, the axial drive controller including a light source, a focusing optical system that focuses a light image based on the light source onto the sample through the objective lens, an autofocus imaging optical system that receives, through the objective lens, light of the light image reflected by the sample, detects the light and forms a reflected image of the light image, and an offset lens to move either one of the light image and the reflected image or both in the direction of the optical axis of the focus optical system or/and autofocus imaging optical system,
the intermittent recording device includes a receiving means that receives a setting of phototaking timing of the intermittent recording,
the intermittent recording device, upon receiving an instruction for switching the autofocus device on, obtains and records an amount of offset of the position of the sample to be observed with respect to a predetermined reference position thereof, the amount of offset corresponding to a distance between a point to be focused of the sample to be observed and the predetermined reference position thereof, and being determined by the microscope and set by an operator by means of the offset lens through the axial drive controller,
the autofocus device focusing on the predetermined reference position of the sample to be observed immediately before each phototaking timing through the focusing optical system, the auto focus imaging optical system and the offset lens, and shifting the stage by an amount determined based on the set amount of offset of the position of the sample to be observed with respect to the predetermined reference position, and
the intermittent recording device further including means for controlling time lapse in which the intermittent recording device instructs a phototaking to the phototaking device at the set phototaking timing when the stage has been shifted by the amount determined based on the set amount of offset of the position of the sample to be observed with respect to the predetermined reference position, and records the phototaking image, and means for terminating the intermittent recording.

2. The intermittent phototaking device according to claim 1, wherein
the microscope is equipped with an observation and phototaking optical system having the objective lens used for observing the sample to be observed and for phototaking an image of the sample to be observed;
the driving system drives the observation and phototaking system for the auto focus movement of the microscope;
the phototaking device photographs the image of the sample to be observed through the observation and phototaking optical system.

3. The intermittent phototaking device according to claim 1 or 2, wherein
the autofocus device controls auto focus operation for focusing on the position of the sample to be observed during a time interval from start to end of the intermittent recordings.

4. The intermittent phototaking device according to claim 1 or 2, wherein
the intermittent recording device stores a plurality of sample points to be phototaken at each intermittent recording and stores auto focusing positions of each sample point,
the intermittent recording device controls lapse of time of the set photo a king timing and instructs the phototaking device to, at respective set phototaking timings, take photos with changing focusing positions with respect to a plurality of the sample points, and records the phototaken images in the intermittent recording device.

5. The intermittent phototaking device according to claim 3, wherein
the intermittent recording device stores a plurality of sample points to be phototaken at each intermittent recording and also stores a focusing position of each sample point,
the intermittent recording device controls lapse of time of the set phototaking timing and instructs the phototaking device to, at respective set phototaking timings, take photos with changing focusing positions with respect to a plurality of the sample points, and records the phototaken images in the intermittent recording device.

6. The intermittent phototaking system comprising:
a plurality of microscopes each being equipped with an objective lens used for observing a common sample to be observed;
an electric stage that holds the common sample to be observed;
a driving system that controls variation in relative position between the stage and the objective lens of each microscope, and driving with respect to an autofocus movement of each microscope;
a plurality of phototaking devices that photograph images of the sample to be observed through the corresponding microscopes; and
an intermittent recording device that controls the driving system and the phototaking devices and captures and processes the phototaking images;
wherein the driving system includes an autofocus device that carries out autofocusing operation of each microscope with respect to the sample to be observed and an axial drive controller that controls a relative position in a direction of the optical axis between the objective lens of each microscope and the sample to be observed, the axial drive controller including a light source, a focusing optical system that focuses a light image based on the light source onto the sample through the objective lens, an autofocus imaging optical system that receives, through the objective lens, light of the light image reflected by the sample, detects the light image, and forms a reflected image of the light image, and an offset lens that moves either one of the light image and the reflected image or both in the direction of the optical axis, the intermittent recording device includes a receiving means that receives a setting of photo-taking timing of the intermittent recording, the intermittent recording device, upon receiving an instruction for switching the autofocus device on, obtains and records an amount of offset of the position of the sample to be observed with respect to a predetermined reference position thereof, the amount of offset corresponding to a distance between a point to be focused of the sample to be observed and the predetermined reference position thereof, and being determined by the microscope and set by an operator by means of the offset lens through the axial drive controller, the autofocus device focusing on a predetermined reference position of the sample to be observed immediately before each phototaking timing through the focusing optical system, the autofocus imaging optical system and the offset lens, and shifting the stage by an amount determined based on the set amount of offset of the position of the sample to be observed with respect to the reference position, the intermittent recording device further including means for controlling time lapse in Which the intermittent recording device instructs a phototaking to the phototaking device at the set phototaking timing when the stage has been shifted by the amount determined based on the set amount of offset of the position of the sample to be observed with respect to the reference position, and records the phototaken image, and means for terminating the intermittent recording.

7. The intermittent photo-taking device according to claim 6, wherein the microscope is equipped with an observation and phototaking optical system having the objective lens used for observing the sample to be observed and for phototaking an image of the sample to be observed;

the driving system drives the observation and phototaking optical system for the autofocus movement of the microscope;

the phototaking device photographs the image of the sample to be observed through the observation and phototaking optical system.

* * * * *

UNITED STATES PATENT AND TRADEMARK OFFICE
CERTIFICATE OF CORRECTION

| | | |
|---|---|---|
| PATENT NO. | : 7,660,523 B2 | Page 1 of 1 |
| APPLICATION NO. | : 11/605327 | |
| DATED | : February 9, 2010 | |
| INVENTOR(S) | : Takaaki Okamoto | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 427 days.

Signed and Sealed this

Thirtieth Day of November, 2010

David J. Kappos
*Director of the United States Patent and Trademark Office*